U̲n̲i̲t̲e̲d̲ ̲S̲t̲a̲t̲e̲s̲ ̲P̲a̲t̲e̲n̲t̲ ̲O̲f̲f̲i̲c̲e̲  3,154,670
Patented Oct. 27, 1964

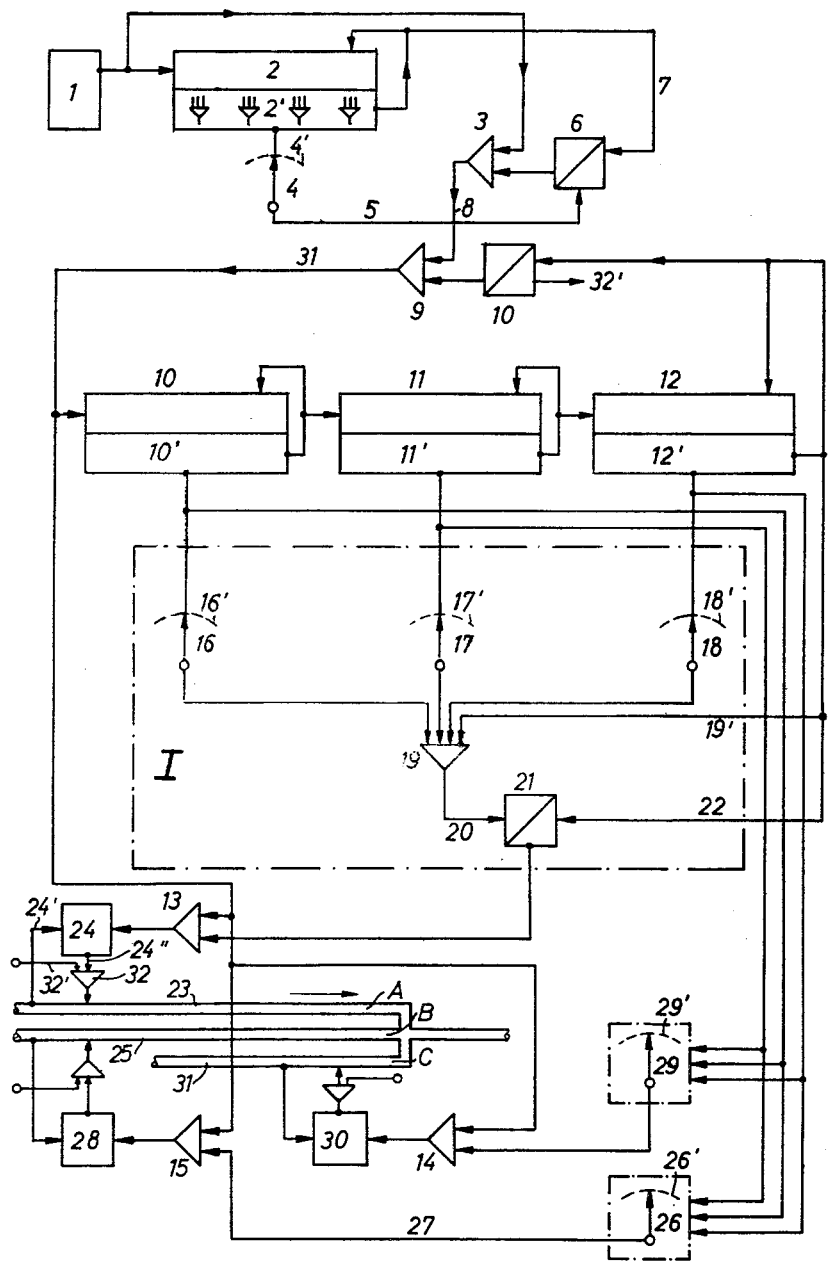

3,154,670
DIGITAL SYSTEM FOR THE CONTROL OF
COMPONENTS OF A MIXTURE
Dieter Gossel, Hamburg-Lockstedt, Germany, assignor to
North American Philips Company, Inc., New York,
N.Y., a corporation of Delaware
Filed Jan. 5, 1962, Ser. No. 164,486
Claims priority, application Germany Feb. 2, 1961
3 Claims. (Cl. 235—92)

The invention relates to an arrangement for the arbitrary adjustment of the desired values of components in a mixture process; in particular, the invention relates to the digital control of the mixture by means of sequences of counting pulses actuated at least in part by the desired values of the components which sequences are derived from the fundamental frequency of a pulse generator.

For mixtures whose components supply the total flow of the mixture with a predetermined, optimally adjusted constant ratio, it is difficult to provide a rapidly operating, reliable fine control, particularly if tolerances of less than 1% are desired.

In mixing liquid media, it is known to electrically convert the passing flow, i.e. the volume passed per unit time, into a series of pulses having a pulse frequency and to compare this pulse frequency with a frequency added to the desired values and derived from a fixed generator frequency; control signals are obtained from the differences counted by difference counters, these signals indicating the deviations in the control.

The digital method is, with respect to accuracy, superior to the similar methods deriving adjusting magnitudes from continuous or analog voltages; the digital methods hitherto known have, however, important disadvantages, particularly in the case of a plurality of components, since the desired mixing ratios, i.e. the ratios between the constituents or between the latter and the total flow cannot always be easily predetermined or initially adjusted.

The correct, predetermined mixing must, moreover, be maintained with all rates of the overall flow, so that the ratios once fixed of the constituents must not vary any more.

According to one aspect of the instant invention, for counting the pulses of the above-noted pulse generator there is provided a multiple ring counter having initially adjustable, parallel-connected outputs, which is added to the regulator of the constituent flows, and by means of the predetermined digit of an output the percentage of the share of the constituent of the total flow can be fixed.

An important advantage of the novel device consists in the use of only one ring counter for an arbitrary number of constituents, the ratios of which can be very readily adjusted and be accurately maintained. The control and adjustment of the mixing according to the invention is therefore extremely accurate, rapid and free of disturbances, while the system can also be readily extended to function with a greater number of constituents.

The pulse frequency is preferably chosen so high that per second a large number of control-pulses is available for the regulators proper, which pulses may, if desired, be integrated, i.e. a whole counting cycle, at the end of which the counting restarts at the beginning, must be traversed a few times per second. For a suitable comparison with the real values of the constituent of the overall flow (converted into a pulse sequence) use may be made of pulse dividers which allow for example each tenth pulse to become operative.

The single figure of the accompanying drawing shows a circuit diagram of one embodiment of the invention.

Reference numeral 1 designates a pulse generator, which may be capable, for example, of supplying a pulse sequence having a repetition frequency of 100 kc./s. The output of the pulse generator 1 is connected to a counter 2 and an and-gate 3. To the counter 2, which may be built up in a conventional manner from bistable trigger circuits composed of tubes or transistors, is connected a decoding matrix 2', which may comprise diodes or combinations of diodes; from the output 5 of the decoding matrix a marking pulse may be obtained with a position of the counter predetermined by the selector switch 4. The output 5 is connected to a bistable trigger circuit 6, which is returned to its initial state at each end of the total counting cycle via the conductor 7. The trigger circuit 6 is connected by its output to the and-gate 3, which thus passes, via the conductor 8, only the desired number of pulses per unit time. The device described also serves for controlling the total flow if a faster or a slower rate is desired.

The sequence of pulses having the reduced repetition frequency is fed to the and-gate 9, which cooperates with a bistable trigger circuit 10. The specific function of this arrangement will be described hereinafter. For the present, however, it is sufficient to know that the generator frequency becomes available at the first element 10 of a ring counter 10, 11, 12 with a number of decimals and at the and-gates 13, 14, 15. The structure of a ring counter is well known in the art; generally, it comprises mainly consecutive trigger circuits, which may be composed of transistors or tubes or glow discharge tubes. Each unit 10, 11 or 12 of such a ring counter corresponds to a place counted from 1 to 9, after which it is set back and thus feeds a counting pulse to the next following unit, and so on, until the last unit is completely counted and a counting cycle has terminated; in the example concerned the cycle is 0 to 999 (or 1 to 1000).

To each counter unit is connected a decoding matrix 10', 11', 12', which is built up in the same manner as the decoding matrix 2' and which permits the feeding, by means of a selector switch 16, 17 or 18, of previously adjustable counting values, in this example having three digits, to an and-gate 19 from the output 20 of the and-gate 19 a pulse is fed to the trigger circuit 21, when the counting value is attained. The output of trigger circuit 21 is fed to the and-gate 13, so that the latter is blocked until the trigger circuit 21 is set back by the last pulse of a counting cycle transferred by the counting unit 12 to the conductor 22. The pulse sequence passing the and-gate 13 of the pulse generator 1 is compared with the pulse sequence supplied for example by a flow meter in the tube 23 for the constituent A in an arrangement 24, which derives from this comparison of the nominal value and the real value an adjusting magnitude for controlling the adjusting member, for example a control-valve, associated with the duct 23.

For the constituent B in the duct 25 only one further group 26 of three selectors and one and-gate and one trigger circuit are required, while the connections for the adjusting stages 26' are in parallel with those of the stages 16', 17', 18' of the selector switches 16, 17 and 18 respectively. The and-gates and trigger circuits following the group 26 of selector switches are composed in the same manner as the group of selector switches 16, 17, 18. The output voltage is fed via the conductor 27 to the and-gate 15, the output of which is connected to the arrangement 28 for the duct 25 of the constituent B.

For the constituent C provision is made of the and-gate 14, the control of which is carried out in the manner described above in connection with gate 13, and which is intended for the arrangement 30 of the duct 31 of the constituent C.

The number of groups of selector switches depends upon the number of constituents and the desired adjusting accuracy of the constituents and on the number of counting units (number of adjusting values). Without adversely affecting the reliability of the device they may be diminished or enlarged by omitting or adding respectively a unit, so that the device can be suitable for a wide variety of conditions.

As an example, it will be assumed that a mixture of constituents is desired, in which the three quantities of constituents A is to be 86.3%, B 2.1% and C 11.6%. Then the group I of selector switches is to be adjusted to 863 (switch 18 to position 8, switch 17 to position 6 and switch 16 to position 3). The group 26 of selector switches must be adjusted correspondingly to 21 and the group 29 of selector switches to 116. The pulse generator 1 must supply a pulse sequence of 100 kc./s. However, only 70% of the total flow capacity is to be employed. To this end the selector switch 4 is adjusted to position (70), so that only 70,000 pulses per second are passed via the conductor 31 to the ring counter 10, 11, 12. This is achieved by simply suppressing three pulses each time after seven pulses passing the and-gate 3. The decade ring counter 10, 11, 12 thus counts pulses occurring in the "seven" groups.

After the 864rd pulse has been reached, the bistable trigger circuit 21 is changed over so that it blocks the and-gate 13. The further pulses lacking from the 1000 are suppressed. When the arrangement 24 comprising a comparer receives, from a flow meter, via the conductor 24' a larger number of pulses during the overall counting cycle of 1000 pulses, a voltage is derived, which permits, via the conductor 24", a valve control for reducing the flow in the duct 23; conversely, flow is increased when a lesser number of pulses is received from the flow meter.

The comparison between the real values and the desired values of the numbers of pulses is only accurate after the termination of a complete counting cycle, since the nominal repetition frequency within a cycle is, so to say, interrupted, if the whole capacity is not employed; therefore, the arrangement 24 must supply an adjusting signal to the adjusting member (valve) at the termination of the counting cycle. To this end the conductor 24" includes an and-gate 32, which changes over via a conductor 32' only at the end of a counting cycle.

After the termination of the 1000th pulse, the bistable trigger circuit 21 is changed back to the initial state by the counting unit 12, the ring counter is adjusted to zero, and the counting cycle starts anew.

The arrangements 28 and 30 operate similarly. They are predeterminedly adjusted by switches 26 and 29. The trigger circuit 10 blocks via the and-gate 9 the supply of pulses to the counter 10, 11, 12 for a new counting cycle until the transfer of the adjusting signal to the arrangement 24 has terminated.

To this end an additional pulse of the generator is suppressed. The additional circuit with the bistable trigger circuit 10, required for suppressing this pulse, is not shown for the sake of simplicity. It consists mainly of an and-gate, which is controlled by the generator.

In order to avoid the simultaneous occurrences of pulses at the trigger circuit 21 via the conductor 20 and the conductor 22 with the choice of constituents at 1000%, the and-gate 19 is arranged so that a blocking pulse across the conductor 19' prevents response.

Instead of the adjustment by means of selector switches, an adjustment by means of punched cards may be obtained; in this case the contacts 16', 17', 18' and 26' and 29' are arranged so that they are located behind the gaps and rows of the punched cards. The desired percentages are marked by punches, which alone permit a connection between the outputs of the decoding matrix and the associated and-gates. This does not require manual adjustment, which may be important with a more frequent change or variation of the mixture of constituents.

Obviously, many variations of the invention are possible in the light of the above teachings. It is therefore to be understood that, within the scope of the appended claims, the invention may be practiced otherwise than as specifically described.

What is claimed is:

1. Apparatus for the control of the constituent elements of a flow mixture, comprising: a pulse generator operating at a predetermined frequency, a continuously operable counter coupled to the output of the pulse generator, means for deriving a pulse sequence from said counter having a frequency less than said predetermined frequency, a ring counter having a plurality of outputs means for applying said pulse sequence to said ring counter, a plurality of selector means conencted in parallel to said plurality of outputs, each selector means being operable to select predetermined pulses of said pulse sequence in accordance with predetermined desired amounts of said constituent elements, selectively operable means associated with each selector means for applying said predetermined pulses to a first input of a comparer, said selectively operable means being controlled jointly by said pulse sequence and said predetermined pulses, means for applying to a second input of said comparer a series of pulses determined by the actual amount of a constituent element, and means coupled to the output of said comparer for varying the flow of said constituent element in a direction to produce said predetermined desired amount.

2. Apparatus as recited in claim 1, wherein said selectively operable means comprises a plurality of first and second and-gates, each selector means has a plurality of outputs all connected to a particular first and-gate, and the output of a particular first and-gate is coupled to one input of a particular second and-gate, said pulse sequence also being applied to a second input of said second and-gate.

3. Apparatus as claimed in claim 2, further comprising a bistable trigger for each selector switch, the output of the ring counter being applied to one input of said trigger circuit and the output of said first and-gate being applied to a second input of said trigger circuit, the output of said trigger circuit being applied to an input of a second and-gate.

References Cited in the file of this patent

UNITED STATES PATENTS

| | | |
|---|---|---|
| 2,715,703 | Schuck | Aug. 16, 1955 |
| 2,922,940 | Mergler | Jan. 26, 1960 |
| 2,977,199 | Quittner | Mar. 28, 1961 |
| 3,011,873 | Davis | Dec. 5, 1961 |
| 3,015,806 | Wang | Jan. 2, 1962 |
| 3,018,224 | Ferrari | Jan. 23, 1962 |
| 3,034,718 | Freitas et al. | May 15, 1962 |
| 3,039,687 | Chope | June 19, 1962 |